(12) United States Patent
Rajacic

(10) Patent No.: US 7,377,142 B2
(45) Date of Patent: May 27, 2008

(54) CYLINDER LOCK WITH CODED KEY FOR BLOCKING THE SHAFT OF THE STEERING WHEEL AND PROTECTION OF THE MOTOR VEHICLE FROM THEFT

(76) Inventor: Zdravko Rajacic, Dalmatinska 46, YU-11000, Belgrade, Serbia and Montenegro (YU)

( * ) Notice: Subject to any disclaimer, the term of this patent is extended or adjusted under 35 U.S.C. 154(b) by 0 days.

(21) Appl. No.: 10/592,176

(22) PCT Filed: Mar. 14, 2005

(86) PCT No.: PCT/YU2005/000005
§ 371 (c)(1),
(2), (4) Date: Sep. 8, 2006

(87) PCT Pub. No.: WO2005/087557
PCT Pub. Date: Sep. 22, 2005

(65) Prior Publication Data
US 2007/0204661 A1    Sep. 6, 2007

(30) Foreign Application Priority Data
Mar. 15, 2004  (YU) .................................. 230/04
Oct. 13, 2004  (YU) .................................. 906/04

(51) Int. Cl.
*B60R 25/02* (2006.01)
(52) U.S. Cl. ............... 70/186; 70/360; 70/DIG. 30
(58) Field of Classification Search .......... 70/182–186, 70/252, 360, 361, DIG. 30
See application file for complete search history.

(56) References Cited

U.S. PATENT DOCUMENTS

| 1,244,893 | A | * | 10/1917 | Reed | 70/185 |
|---|---|---|---|---|---|
| 1,316,946 | A | * | 9/1919 | Foster | 70/309 |
| 1,342,728 | A | * | 6/1920 | Welch | 70/252 |
| 1,736,900 | A | * | 11/1929 | Carpenter | 70/185 |
| 2,032,821 | A | * | 3/1936 | Waits | 70/185 |
| 2,135,759 | A | * | 11/1938 | Mabee | 70/252 |
| 2,148,609 | A | * | 2/1939 | Edwards | 70/252 |

(Continued)

*Primary Examiner*—Lloyd A. Gall
(74) *Attorney, Agent, or Firm*—Abelman, Frayne & Schwab

(57) ABSTRACT

This invention relates to the cylinder lock with a coded key for blocking the steering wheel shaft and the protection of motor vehicle from theft. The lock consists of the housing (1), which is fastened on the bush (2) placed on the shaft (3) of the steering system, inside of which there is a sliding cylinder (4) with a coded key (5). In the cylinder (4) there is a keyway (14) in which there is peak of the pin (13) fastened in the housing (1). On the core (8) by the linchpin (16) a bush (15) is fastened, on which there is a ring eccentre (17) with the area (18). On the bush (15) there is placed a spiral spring (20). In the housing (1) along the eccentre (17) the pin (19) and the inductive switch (27) are placed. Inside the bush (15) the spiral spring (24) and the piston (25) are placed, while the peak of the piston (25) is fastened by the linchpin inside the piston (26) for locking. The free end of the piston (26) is placed in the keyway (28) of the bush (29) fastened in the shaft (3). In order to unlock, the core (8) is rotated and the cylinder (4) is axially moved. In the unlocked position the ring eccentre (17) is secured by pin (19) and activates switch (27).

17 Claims, 5 Drawing Sheets

U.S. PATENT DOCUMENTS

| | | | |
|---|---|---|---|
| 2,199,226 A * | 4/1940 | Lowe | 70/252 |
| 2,295,723 A * | 9/1942 | Duncan | 70/186 |
| 2,344,860 A * | 3/1944 | Foster | 70/309 |
| 2,348,134 A * | 5/1944 | Jacobi | 200/43.08 |
| 3,426,560 A * | 2/1969 | Dwan | 70/252 |
| 4,418,554 A * | 12/1983 | Wolfgang | 70/360 |
| 4,751,832 A * | 6/1988 | Carballo | 70/242 |
| 4,854,142 A * | 8/1989 | Peitsmeier et al. | 70/186 |
| 4,956,983 A * | 9/1990 | Okamura et al. | 70/241 |
| 6,076,381 A * | 6/2000 | Green | 70/186 |
| 2002/0069683 A1* | 6/2002 | Bartels et al. | 70/186 |

* cited by examiner

CYLINDER LOCK WITH CODED KEY FOR BLOCKING THE SHAFT OF THE STEERING WHEEL AND PROTECTION OF THE MOTOR VEHICLE FROM THEFT

FIELD OF INVENTION

The subject of this invention belongs to, generally speaking, the field of traffic and transport, i.e., the field of vehicle equipment. The subject of the invention can also belong to the field of construction, i.e., the field of locks, ironwork and strongboxes, more precisely to the field of locks and equipment thereof. More specifically, the invention belongs to the field of mechanical locks for preventing the shafts or axes from rotating, i.e., for blocking them, even more precisely, to the field of locks for the prevention of vehicle theft.

TECHNICAL PROBLEM

The technical problem wished to be solved by the subject application is how to construct the cylinder lock with a coded key which would absolutely block the shaft of the steering wheel and protect the motor vehicle from theft and damaging the steering wheel of a vehicle. The cylinder lock with the coded key is simple to construct, easy, safe and fast to unlock/lock, absolutely break-proof and with an unlimited number of possible "coding" combinations.

BACKGROUND ART

There are numerous lock solutions presented in patent and non-patent literature. The term lock should denote, apart from the usual door locks of various kinds, the lock for the vehicle steering wheels, as well as all kinds of special locks such as padlocks and other. Theoretically, there are several groups of locks that are different from each other by way of locking/unlocking. There are also locks with rotary keys which move the lamellar arresters perpendicularly to the key, locks having arresters which adjust by putting in the key, locks in which the slide valve is moved by means other than the key, locks with permutations, locks with display devices or time counters, locks for special purposes, etc. The most common types of locks are the cylinder locks with arresters in the shape of pins or small balls and cylinder locks with lamellar arresters.

One known solution of the lock is the Yugoslav patent application no. P-731/92 in which the cylinder lock made up of a cylinder and a key is presented. The cylinder is profiled as a semi cylinder and contains a cylinder housing that at its upper, essentially round cylinder part, contains longitudinal opening of the core for the installation of the cylinder core. The cylinder core bears the element for locking on its inwardly located end. The rotation of the cylinder core is in that manner conveyed to lock elements. The lock element remains axially immovable in the slit of cylinder housing. The flange part of the cylinder housing extends radially to the round cylinder part. The housing through-holes arranged in the succession, which also extend radially to the core of the cylinder, are to be put in the flange part. Their ends, far from the cylinder core, are sealed helped by the keys. These housing through-holes serve to hold the springs of keys as well as the keys themselves. The core through-holes are oriented radially in relation to the cylinder core to hold the linchpins, which are straightened with the housing through-holes. The housing keys and the core keys form a limiter, which prevents the rotating of the cylinder core and thus the lock elements, too, as the key is not put in. The core wedges move only by putting in the appropriate key in the channel in the cylinder core, so that the special link between the core wedges and the housing wedges is located on the level of the sliding link of the cylinder core.

Another known solution has been presented in the patent document YU PS 45139 entitled "Cylinder Lock with Double Locking of Cylinder". This solution relates to a cylinder lock with double locking of cylinder in which the locking of the cylinder is achieved from two sides, by different systems of linchpins and lifter by using a profiled key, so that from the lower part of the cylinder the standard system of shutting linchpins and lifters is used, under the influence of springs, and from the above the system of sealing linchpins and lifters placed in the upper part of the vertical plane, which passes through the cylinder axis, and is movable under the influence of the gravitation force. Apart from that, in the middle the cylinder grooves are made into which the plates are put, what serves for the purpose of preventing the unlocking of the upper system by various objects.

Other relevant known solutions are presented in Yugoslav patent applications P-500/98 in which the programmed cylinder lock with main keys is shown, P-1812/80 in which the profiled cylinder lock is presented, P-678/92 presenting the steering wheel lock, P-1487/86 presenting the blocking safety lock for motor vehicles, etc.

Main disadvantages of the known locks, some of which are in the above passage, are complicated construction, possibility of breaking, small number of coding combinations are limitation in use.

SUMMARY OF INVENTION

This invention relates to the cylinder lock with a coded key for blocking the steering wheel shaft and the protection of motor vehicle from theft. According to the patent application by the same Applicant No. P-565/03, the cylinder lock with a coded key is also known, this lock consisting of a cylinder, which consists of the outer protective covering inside of which there is a housing and coaxially with it, there is a cylinder core placed rotatably, in which there is the axially made central opening. In the axis of the said opening there is placed the key-guiding pin. In the body of the housing there are radially made through-holes, while coaxially with them in the core other through-holes are made. Within the through-hole of the housing there are placed springs, plates and sealing plugs, while in the core through-holes sliding arresters are placed. The arresters are made as pins and ball pairs. The pin, which by its free end stretches to the very entrance into the cylinder, which is by its other (left) end fastened in the bushing attachment for unlocking placed in the core. The core, the bushing attachment and the pin are interconnected by a screw which is radially twisted in the bracket part of the core. The front side of the cylinder, i.e., the side of the penetration of the key, is closed by the safety plate. The key consists of the handle and the body with openings for the penetration of the arrester peaks, while the peak of the body of the key is made with a profiled slope which fits the profile of the attachment. The so-called lock "coding" can, at the same time, be done by a number of arresters, their distribution on the cylinder radially as well as axially over the volume of the housing, by changing of the depth of the penetration of the arresters into the body openings and by the changing of the attachment length.

What represents the novelty of the solution is that inside the housing, which is fastened on the covering provided on the shaft of the steering system, there is provided a sliding cylinder with a coded key. There is a keyway in the cylinder in which there is the pin peak fastened in the housing. On the cylinder core there is fastened a bushing on which there is an eccentric locking ring with a truncated area, while provided in the bushing there is a spiral spring. In particular, inside the bushing are a spiral spring and a first piston, the peak of which is fastened in a second (i.e., "locking") piston. The free end of the second piston is positioned in the bushing keyway (i.e., opening) provided on the shaft. The cylinder housing of the locking mechanism is fastened on the bushing under right angle which is firmly on the shaft of the steering system, while the bushing is fastened on the plate for placing on the chassis.

Namely, on the left end inside the housing there is placed a sliding cylinder with a coded key, the cylinder consisting of the outer protective covering inside of which there is a stator, while inside the stator and rotatably in it, a core is placed. The covering and stator are fastened to one another by a pin, while the front side of the cylinder is closed with a safety ring. In the cylinder there is a keyway in which the pin peak is placed, while the pin is by its other end fastened in the housing. On the free end of the cylinder core which comes out of the stator a bushing is placed, while the core and bushing are radially interconnected by the placed linchpin. From the outside on the bushing there is an eccentric locking ring on which there is a truncated area. On the bushing a spiral spring is placed, while the spring, by its left end, leans against the rim, while by its right end it is placed on the keyway made in the ring. In the housing, with the said eccentric locking ring, the pin is also fastened on the bushing. Also, with the said eccentric locking ring and the pin, an inductive switch is placed which is activated by the eccentric locking ring. Inside the wedge, which is limited from the left hand side by the front part of the core, and from the right hand side by the wall in which an opening is made, a spiral spring and a piston are placed. The piston peak, which penetrates the opening made in the wall and is outside the bushing, is placed axially inside the hole made in the locking piston, while the piston peak and the locking piston are interconnected by the radially placed linchpin. The free end of the locking piston, which penetrates the openings made in the bushings, is placed in the keyway made axially in the bushing, which is fastened on the shaft through one or two radially placed linchpins.

The object of this invention is to enable the making of the cylinder lock safe while blocking the steering wheel shaft for the following purposes: a) the protection of motor vehicle from theft and the cases when it comes to the damaging of the vehicle steering wheel, and b) to additionally disable the engine ignition by possessing the inductive switch connected to the ignition relay. The lock is of simple construction and absolutely break-proof.

The invention—the cylinder lock with a coded key for blocking the shaft of the steering wheel and the protection of motor vehicle from theft of this patent application, has many advantages, some of which are:

assured blocking of the shaft of the steering wheel and the protection of motor vehicle from theft and in cases of damaging the steering wheel of a vehicle, allows the engine ignition only upon the unlocking of the lock and taking out of the key, simple construction, construction and use of the top quality material do not allow the revelation of the "code", unlimited number of "coding" combinations, practically and absolutely impossible to break or "comb", easy to install and maintain, practically unlimited duration, functionally very practical and reliable, safe in operation, can be serially manufactured, geometrically ideal in shape and of small contour dimensions.

BRIEF DESCRIPTION OF DRAWINGS

For the purpose of easier understanding of the invention, as well as to demonstrate how it can be materialized in practice, the Applicant refers to the attached drawing in which.

To facilitate understanding of the invention, identical reference numerals have been used, when appropriate, to designate the same or similar elements that are common to the figures.

DETAILED DESCRIPTION OF THE INVENTION

Figure 1:
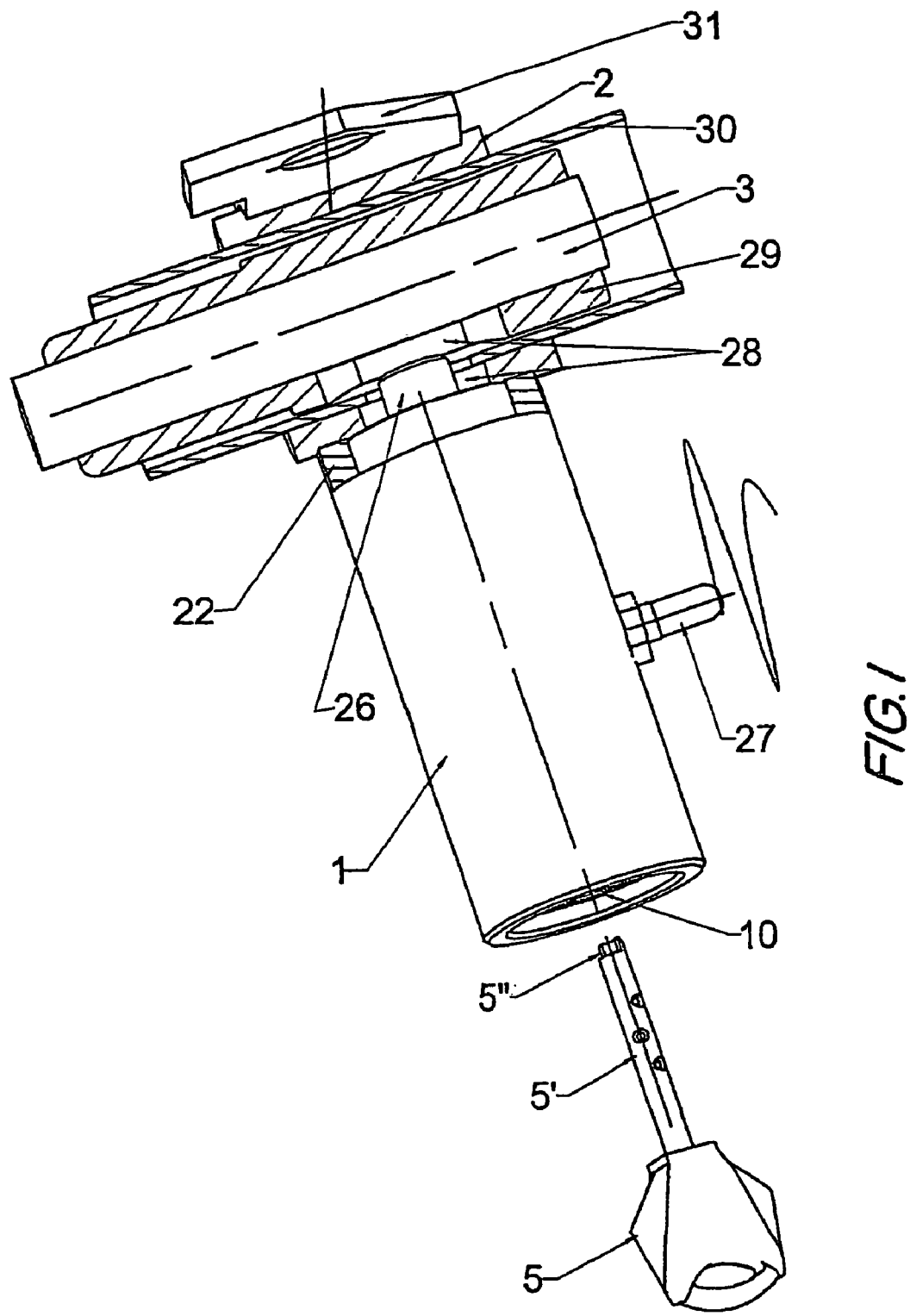
FIG. 1 presents the cylinder lock with a coded key for blocking the steering wheel shaft and the protection of motor vehicle from theft of the invention, in general view, partial intersection and perspective view.

What is necessary to mention before the very detailed description of the cylinder lock is that the solution of the invention is presented only as one in a sequence of possible combinations of materialization and therefore it should be deemed only one of the examples.

The cylinder lock with a coded key for blocking the vehicle steering wheel shaft and the protection of motor vehicle from theft, of the invention and FIGS. 1 through 5, consisting of a housing 1, within which there is a locking mechanism and a steering shaft (i.e., first) bushing 2 by which the lock is fastened on a shaft 3 of the steering system. The housing 1 is put and fastened on the steering shaft bushing 2 under right angle. On the steering shaft bushing 2 a plate 31 is fastened, FIG. 1, by which the cylinder lock of the invention is fastened on the vehicle chassis.

Inside the cylinder housing 1, on its left end, a cylinder 4 with a coded key 5 is installed to slide. Cylinder 4 consists of the outer protective covering 6 in which there are put-"packed" the appropriate subassemblies and cylinder elements. Inside the covering 6, there is a firmly installed housing-stator 7, while inside the stator 7, coaxially with it and rotatably in it, there is installed a cylinder rotor-core 8. The covering 6 and the stator 7 are fastened one to another by a pin 9. The front side of the cylinder 4, i.e., the side of the insertion of the key 5, is closed by a safety ring 10, which is preferably welded to the covering 6. In this manner it is made impossible to "pull out" the cylinder mechanism from the covering, so the ring 10 at the same time also serves as a safety element to prevent the lock breaking.

Figure 2:
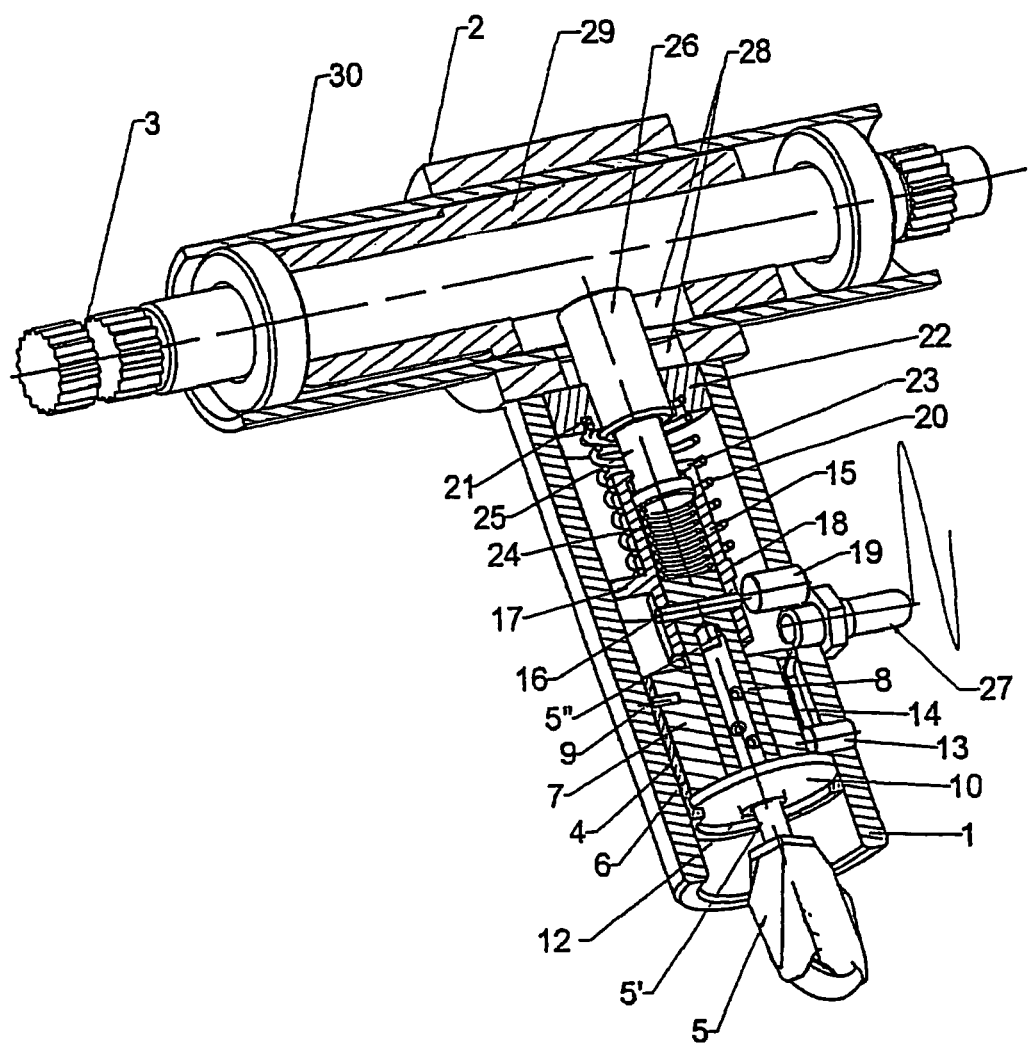
FIG. 2 presents the cylinder lock of FIG. 1 in locking stage, in vertical intersection and perspective view.

Referring to FIGS. 1 and 2, the cylinder 4 with a covering 6 is axially inserted to slide in the housing 1 and is guided by a guiding pin 13. This pin 13 is by one end fastened in the housing 1, while by its other free end it is inserted in the keyway 14 consisting of a slot made in the covering 6 and a channel made in the stator 7. On the free end of the core 8, which comes outside the stator 7, axially with the core 8 there is installed an unlocking (i.e., second) bushing 15. The free end of the core 8 and the unlocking bushing 15 are radially interconnected by an installed linchpin 16. From the outer side of the unlocking bushing 15 there is an eccentric locking ring 17 for locking having a truncated area 18. Along the side area of the eccentric locking ring 17, and in housing 1, there is fastened a pin 19 to which the eccentric locking ring 17 leans in the unlocked and locked position. Also, from the left hand side of the pin 19 on the housing 1 there is also fastened the inductive switch 27. On the unlocking bushing 15 and its right end there is positioned a spiral spring 20 for axial returning—"ejecting" of the cylinder 4 while unlocking. The left end of the spring 20 leans against the eccentric locking ring 17, while the right end of the spring is placed in a keyway (i.e., opening) 21 made in ring 22.

Inside the unlocking bushing 15, which is limited on the left hand side by the front of the core 8, and from the right hand part by the wall 23 in which an opening is made, a spiral spring 24 is placed, as well as the first piston 25. The peak of the first piston 25, which penetrates the opening in the wall 23 and is outside the unlocking bushing 15, is placed axially inside the hole made in a second piston 26 for locking. The peak of the first piston 25 and the second piston 26 are interconnected by a radially placed linchpin. The free end of the second piston 26 penetrates the opening made in the steering shaft bushing 2 and enters an opening 28 formed axially in the steering shaft and adapter bushings 2 and 29. The adapter (i.e., third) bushing 29, which is can be placed in the shaft 3 inside the cylindrical protective lining 30, serves in certain vehicle types to bridge the difference between the diameter of the standard steering shaft bushing 2 and the shortened diameter of the shaft 3 for vehicle steering, so here it is presented only as an example. The steering shaft and adapter bushings 29 are fastened from the axial movement along the shaft 3 on the appropriate place on the shaft 3, preferably by sticking.

The very cylinder 4, according to the patent application no. P-565/03 by the same Applicant in Serbia and Montenegro will not be described in detail because it is not the subject of the invention. However, it should be emphasized that in the body of the stator 7 several openings, i.e., through-holes are made, the axes of which are placed radially. In this case the axes of all through-holes are, in relation to the axial axis, placed normally and in a sequence along the stator 7. The through-holes are placed in certain number of rows with several through-holes, while their axes do not have to be placed in the same axial plane. The through-holes in the stator 7, which are of the longer diameter and greater radial depth, immediately before the core 8 transfer into the through-holes of shorter diameter and lesser radial depth so that in the lower part of the hole through it achieves the point of support as a ring. Inside the through-holes there can be placed, the springs which from the outside lean against the plates, and on the inside they lean against the outside of the upper part of the body of sealing plugs. The sealing plugs are in the cross section made in the shape of letter T. The plates on the opposite side of the springs lean against the covering 6. The plugs are radially placed to slide in the through-holes by the upper part of the body of a larger diameter, while by the lower part by the body of the shorter diameter they are placed in the through-holes of a shorter diameter. By the lower parts of their bodies—the wedges, the sealing plugs penetrate the through-holes of the shorter diameter, exit the stator 7 and enter the through-holes made in the core 8. Also, the plugs, by their lower areas of the body, lean coaxially against the arresters which are made as wedges, or as ball pairs, or in combination. The arresters are all placed to slide inside the through-holes made in the core 8. As the arresters as wedges, i.e., balls, are placed in the through-holes made in the core 8, the through-holes are obviously placed coaxially in relation to each other. The wedges can be/are of different length, by what the possibility of additional "coding" of the lock is achieved.

As it has already been said, apart from the possibility that the distribution of the through-holes be changed in various manners over the volume of the cylinder 4 and in axial and radial direction, as well as their total number, in that manner the distribution and the number of through-holes with wedges, i.e., balls, can be varied/combined. In this manner one can achieve a greater number of coding combinations, facilitate the lock functioning and additionally disable any unlawful opening, through what a cylinder lock practically and absolutely break-proof is achieved.

The free wedge peaks, i.e., the inner balls, which penetrate the through-holes and get out into the opening, lean freely on the pin 11 which is placed in the central axis within the opening 12 of the core 8. As the contact lines of the plugs and wedges, i.e., the contact lines of plugs and balls, are moved radially in relation to the contact line of the stator 7 and the core 8, the lock is being locked in that manner. The pin 11, as FIG. 3 clearly shows, by its left free end extends until the very entrance into the cylinder 1 and serves both for guiding the body 5' of the key 5 and for blocking the entrance so that the "breaking device" cannot be inserted into the lock in an attempt of breaking it.

The pin 11 is, with its other (right) end, fastened in the opening (12) to the core (8), while the core (8) is fastened to the unlocking bushing (15). The core 8, the unlocking bushing, and the pin 11 are tightly interconnected with a screw (not shown), which is radially twisted in the bracket part of the core 8. The screw penetrates the unlocking bushing (15) and core (8) and by its end penetrates the keyway made in the pin 11. In this manner the screw fixes the pin 11 in that position.

The key 5 for the cylinder 4 is of special design, FIG. 2. The key consists of the handle and the body 5'. The body is cylindrical with a thin wall in which there are radially made openings for the penetration of the peaks of the said wedges, i.e., balls. The axes of the openings fit with the distribution and axes of the through-holes in the cylinder 4, i.e., with eight wedges, i.e., balls. The peak 5" of the body 5' of the key is made with the profiled slope which is adjusted for the firm grip with a slant of the same profile made on the front side of the unlocking bushing 15.

The manner of functioning of the cylinder lock of the invention is simple and in the obvious manner comes from the previous description and figures, so it does not need to be described in detail. The cylinder lock is, as it has been presented in FIG. 3 clearly, in the unlocked stage. In order to achieve this, the body 5' of the key 5 is put in-inserted into the opening 12 of the core 8 and the key is guided along the pin 11. Because of the small gap between the core 8 and the pin 11, the body 5' is centered and guided to the unlocking bushing 15. The thickness of the key body is only slightly less than the gap, i.e., the channels which form the core 8 and the pin 11 in the opening 12, so that the body 5' of the key is in a fine and smooth manner guided along the opening 12 and the pin 11. As it enters the opening 12 the peak 5" of the body 5 meets the peak of the first wedge, i.e., ball, lifts them overcoming the spring resistance, making the way free to the peak to the following wedge, i.e., ball, and so on. While the key is sliding along the pin 11, the wedge peaks, i.e., balls, slide along the outer surface of the body 5'. In this position all wedges, by their peaks lean against the body 5' of the key. By further turning of the key 5 for a relatively small radius in one moment there comes to the fitting of axes of each of the openings on the body 5' with the axes of the appropriate wedges, i.e., balls. At that moment all wedges, i.e., balls, through the sealing plugs which are influenced by the springs, at the same time are inserted in the openings on the body 5' of the key. As the peaks of the wedges, i.e., balls, and their projection into the appropriate openings on the key body to certain depth, there comes to the placement of lines—touch points of the plugs with the arresters and the touchline of the stator 7 and core 8 into the same plane, by what the lock is put into the unlocked state. In this manner the core 8 is made free and becomes mobile inside the stator 7. By further turning of the key 5 and the impact of the profiled peak 5", to the profiled bushing there turns the core 8, and with it the unlocking bushing 15 by which the core is connected through the linchpin 16.

Figure 3:
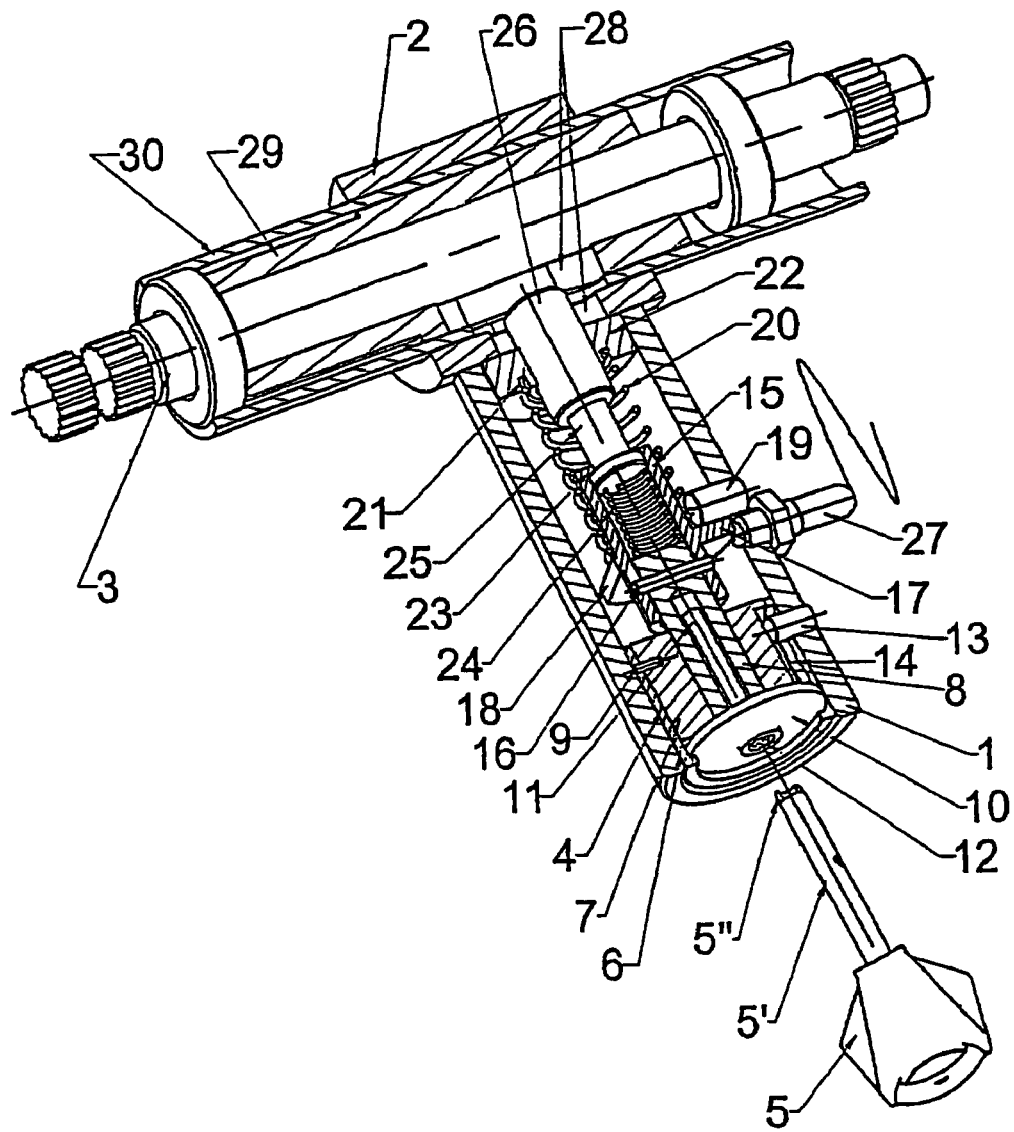
FIG. 3 presents the lock of FIG. 2 in the unlocked stage and the key taken out, in vertical intersection and perspective view.

In the unlocked stage, FIG. 3, the cylinder 4 is in the "pulled out" position, i.e., the ultimate left hand side position under the impact of the spring 20 and secured in that position by the eccentric locking ring 17, which leans against the left hand side onto the pin 19. As the core peak 8 and the unlocking bushing 15 through the linchpin 16 are connected, thus the unlocking bushing 15 is placed on the ultimate left hand side position. The pulling away of the unlocking bushing 15 induces the pulling away of the first piston 25, by leaning the wall 23 onto the head of the first piston 25 and the second piston 26 through the linchpin which connects them. In this manner the peak of the second piston 26 is found in the ultimate left hand side position and is pulled out of the opening 28 made in the adapter bushing 29, so the cylinder lock is unlocked, and the shaft is free and movable. In this way the inductive switch 27 is also stirred and turned on by the impact of the eccentric locking ring 17, what causes the flow of electricity to the assisting switch relay, what enables the start off and the ignition of the engine.

Figure 4:
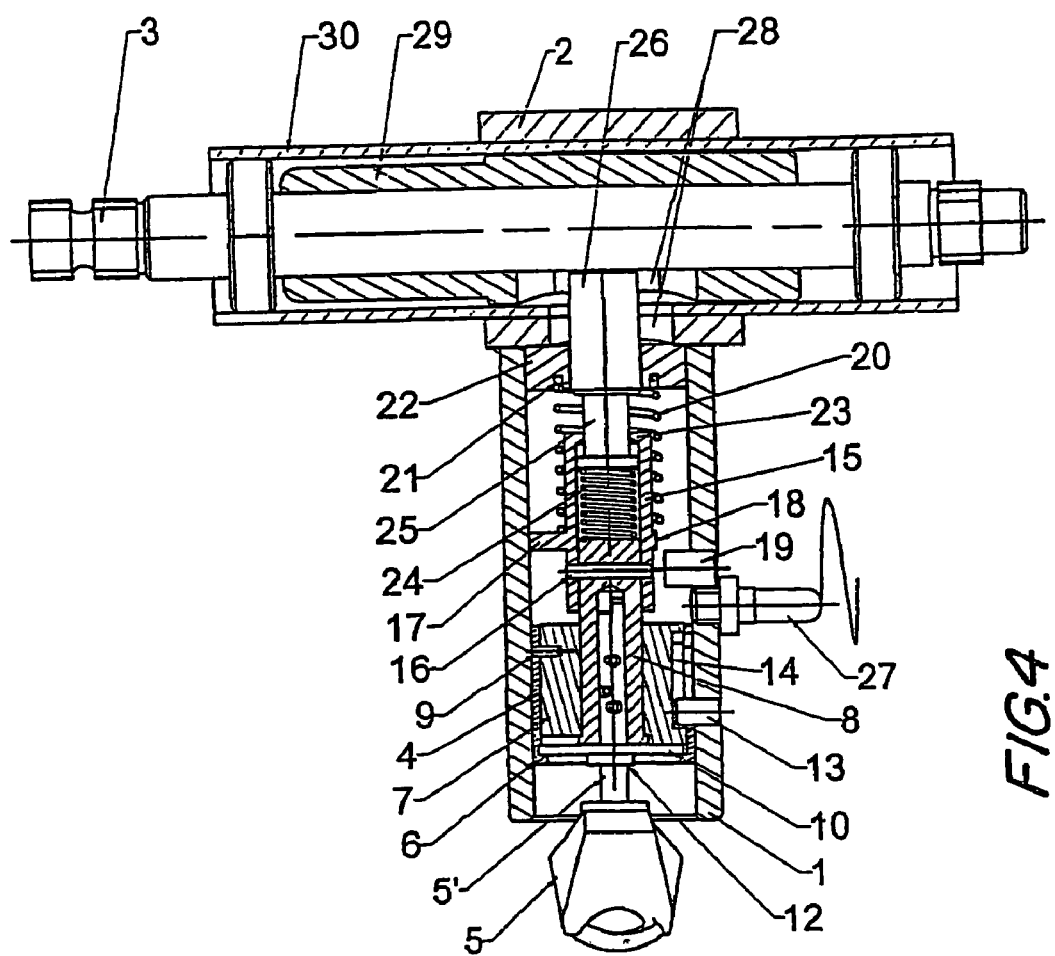
FIG. 4 presents the lock of FIG. 3 in locking stage, in vertical intersection.
Figure 5:
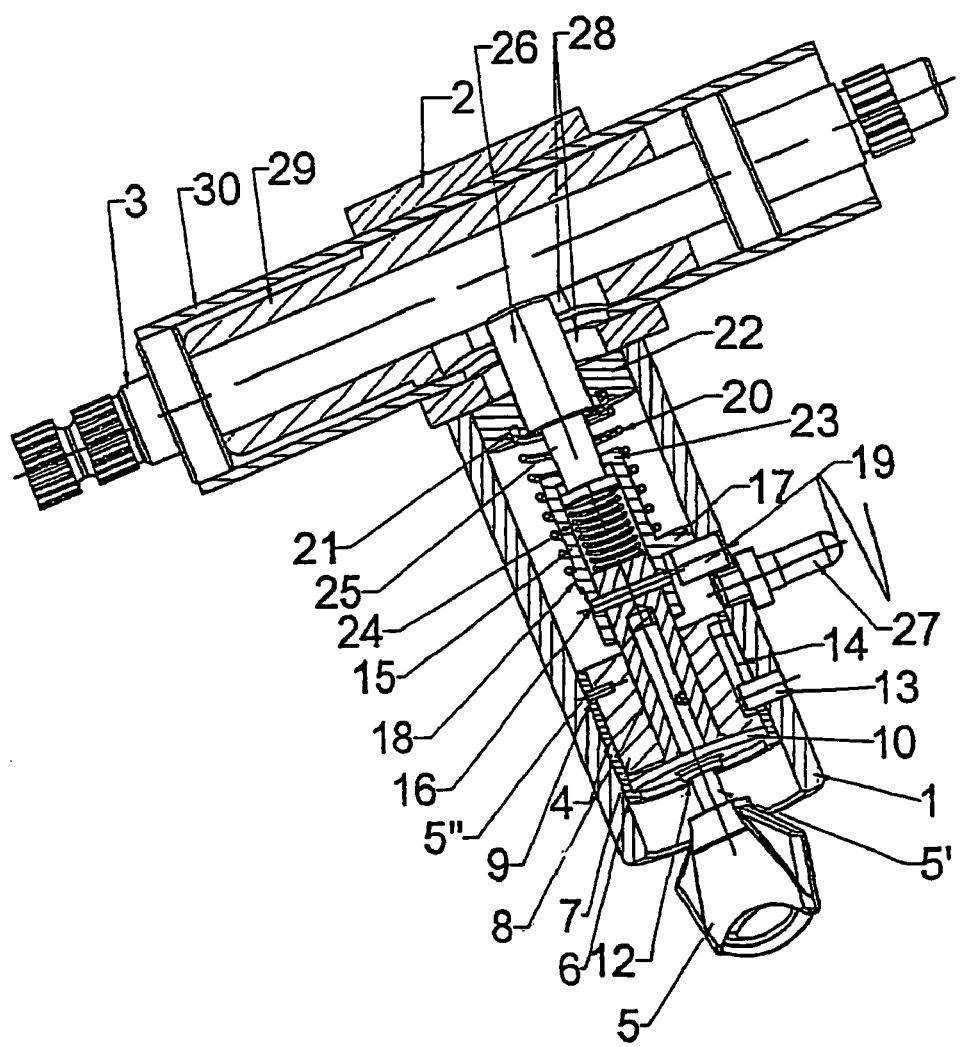
FIG. 5 presents the lock of FIG. 3 in the locked stage, in vertical intersection and in perspective view.

For the purpose of locking, FIG. 5, it is necessary to perform the locking actions shown in FIG. 4. By turning the key 5, the core 8, along with the unlocking bushing 15 also turns, since they are interconnected by the linchpin 16. By turning of the unlocking bushing 15, the eccentric locking ring 17 also turns by sliding along the side area over the pin 19. At the moment when the eccentric locking ring 17 by its truncated area 18 comes to the end of the pin 19, the unlocking bushing 15 is axially set free and "passes" over the pin peak 19. By further pushing of the cylinder 4 axially to the left hand side, the entire cylinder 4 moves by sliding within the housing 1 to the right. This transfer equals the length of the keyway 14 in which the pin 13 is led, so that the pin from the ultimate right hand side position is led to the ultimate left hand side in relation to the keyway 14. The eccentric locking ring 17 "skips" the pin 19, moves onto the right, while the hole through spring 20 is pressed. The first piston 25 under the influence of the inner spring 24 pushes the second piston 26 which by its end penetrates the opening 28 of the steering shaft and adapter bushings 2 and 29. By further turning of the key 5, i.e., the core 8, the eccentric locking ring 17 by its side area leans against the pin 19 from the right hand side and is placed in the position securing the entire mechanism and locking presented in FIG. 5. In this manner the eccentric locking ring 17 also moves away from the inductive switch 27 which it cannot influence anymore, and by that the engine is additionally secured from the possible ignition before the complete unlocking. The key is then turned for further 90 backwards and taken out leaving the lock locked. The unlocking is done in the manner described above.

The construction characteristics of the lock and the said possibilities of achieving the "coding" provide the innumerable combinations and disable the "decoding". Also, the construction characteristics of the lock consisting of the narrow channel between the opening 12 and the pin 11, the position of the locking bushing at the bottom of the opening 12 and its inaccessibility, top quality of materials for the parts, especially the safety ring 10, the precision in making, and its being break-proof because of the large number of combinations, make the lock both practically and absolutely safe from breaking. The special place in which the lock is put, i.e., on the shaft 3 of the steering system, additionally and absolutely prevents the steering, even at the cost of breaking, and pulling out of the steering wheel from the shaft where it is placed together with some other kind of protection system, such as "claws", "paws" or levers.

The materials which are used for the making of this lock are highly alloyed steels which possess special quality of mechanical hardness and resistance to any kind of breaking, so that when this lock is in question, it is clear that it is about a device for locking of the highest degree of security.

Regarding the purpose, the lock is universal because neither the materials, nor dimensions limit it.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

The invention claimed is:

1. A cylinder lock with a coded key for blocking a shaft of a steering wheel and protection of a motor vehicle from theft, the characteristics of which are that on a left end inside a housing (1) there is a sliding cylinder (4) adapted to receive a coded key (5), where the cylinder (4) comprises an outer protective covering (6) inside of which there is positioned a stator (7), the stator (7) housing a rotatable core (8) therein and the covering (6) and the stator (7) being interconnected by a pin (9), and a front side of the cylinder (4) being closed by a safety ring (10), characterized in that the housing (1), is fastened on a first bushing (2) placed on a shaft (3) of steering system, the cylinder (4) is axially housed by said housing (1) and includes an axially aligned slot (14) in which a peak portion of a pin (13) is placed and fastened in the housing (1), that on the core (8) of the cylinder (4) a second bushing (15) is placed on which there is an eccentric ring (17) having a truncated area (18), while on the second bushing (15) a spiral spring (20) is placed, that in the housing (1) along the eccentric ring (17) a pin (19) and an inductive switch (27) are transversely fastened, that inside the second bushing (15) a spiral spring (24) and a piston (25) are placed, that the peak of the piston (25) is fastened to a lower portion of a second piston (26) for locking and that an opposing free end of the second piston (26) is placed in an opening (28) formed in the bushing (2).

2. The cylinder lock of claim 1, characterized in that in a lower part of the cylinder (4) there is the axial slot (14) in which one end of the pin (13) is placed, and an opposing end of the pin (13) is fastened in the housing.

3. The cylinder lock of claim 1, characterized in that on the free end of the core (8) which rotatably extends beyond the stator (7), the second bushing (15) is placed, the core (8) and the second bushing (15) being radially interconnected by a linchpin (16), and that from the outside of the second bushing (15) there is formed the eccentric ring (17) for locking on which the truncated area (18) is formed, and that from the outside on the second bushing (15) the spiral spring (20) is placed, while the spring (20) by its left end leans against the eccentric ring (17), while by its right end it is placed in a ring keyway (21) formed in a ring (22) circumscribing the second piston (26).

4. The cylinder lock of claim 3, characterized in that the inside of the second bushing (15), which is limited from the left hand side by a front part of the core (8), and from the right hand side by a wall (23) in which there is an opening, the spiral spring (24) and the piston (25) are placed.

5. The cylinder lock of claim 4, characterized in that the peak of the piston (25), penetrating the opening made in the wall (23) and placed outside the second bushing (15), is placed axially inside a hole made in the second piston (26) for locking, while the peak of the piston (25) and the second piston (26) are interconnected by a radially positioned linchpin and the free end of the piston (26), wherein a third bushing (29) circumscribes said shaft (3) and is sized to be received by said first bushing (2), said third bushing (29) having an opening aligned with the opening (28) in the first bushing (2) such that the peak of the second piston (26) can penetrate the openings made in the first and third bushings (2, 29).

6. The cylinder lock of claim 1, characterized in that the housing (1) is fastened perpendicularly from a first side of the first bushing (2), which is fastened about a covering (30) of the shaft (3) of the steering system, and a plate (31) fastened from an opposite side on the first bushing (2) for attaching the lock onto a chassis portion of the vehicle.

7. The cylinder lock of claim 6, characterized in that the peak of the piston (25), penetrating an opening made in a wall (23) and placed outside the second bushing (15), is placed axially inside a hole made in the piston (26) for locking, while the peak of the piston (25) and the piston (26) are interconnected by a radially positioned linchpin and the free end of the piston (26), which penetrates openings made in a third bushing (29) and the first bushing (2), while the third bushing (29) is fastened on the shaft (3).

8. A cylinder lock with a coded key for blocking a shaft (3) of a steering wheel and providing protection of a motor vehicle from theft, comprising:
 a steering shaft bushing (2) circumscribing a portion of said shaft (3) and having an opening (28);
 a housing (1) having a first end positioned over the opening (28) and extending perpendicular and radially outward from said steering shaft bushing (2); said housing (1) having an interior and open second end for receiving a sliding cylinder (4) adapted to receive a coded key (5); said cylinder (4) comprising:
  a stator (7);
  an outer protective covering (6) circumscribing said stator (7);
  a rotatable core (8) positioned within and having a free end extending coaxially from said stator (7), said covering (6) and the stator (7) being interconnected by a first pin (9), and a front portion of the cylinder (4) being closed by a safety ring (10);
 an unlocking bushing (15) including an eccentric ring (17) housed within said housing interior and extending longitudinally from a rear portion of the core (8), said unlocking bushing (15) including an end wall (23) having a central orifice;
 a first pin (19) positioned transverse and extending through the housing (1) and having an end extending proximate the eccentric ring (17), wherein said eccentric ring (17) slidably engages opposing sides of said pin (19) upon rotation of said cylinder (4);
 a first piston (25) having a top portion extending through said central orifice in the end wall (23);
 a first coil spring (24) positioned in said unlocking bushing (15) between the rear portion of the cylinder (4) and a bottom portion of said first piston (25);
 a second piston (26) longitudinally extending axially from and having a first end fastened to the top portion of said first piston (25), a portion of said second piston (26) being circumscribed by a locking ring (22) positioned in the interior of and proximate the first end of the housing (1), said second piston (26) having a second end sized to slidably traverse through an opening formed in the ring (22) and the opening (28) formed in the shaft bushing (2); and
 a second coil spring (20) circumscribing said unlocking bushing (15) and said first piston (25) between said the eccentric ring (17) and the locking ring (22).

9. The cylinder lock of claim 8, wherein said cylinder (4) includes an axially aligned slot (14) formed between said stator (7) and covering (6) that is sized to receive a second pin (13) extending transversely therethrough from the housing (1).

10. The cylinder lock of claim 8, wherein said eccentric ring (17) has a truncated area (18) for passing over the end of pin (19) during movement of the cylinder (4).

11. The cylinder lock of claim 8, wherein the core (8) and the unlocking bushing (15) are radially interconnected by a linchpin (16).

12. The cylinder lock of claim 8 further comprising an inductive switch (27) extending transversely through the housing (1) proximate the first pin (19), wherein contact with the eccentric ring (17) controls ignition of said motor vehicle.

13. The cylinder lock of claim 8, wherein the top portion of the piston (25) penetrates the orifice formed in the wall (23) and extends longitudinally outward from the unlocking bushing (15), said top portion of the piston (25) being positioned axially inside a hole formed in the second piston (26) and fastened thereto via a linchpin.

14. The cylinder lock of claim 8 further comprising an adapter bushing (29), said adapter bushing (29) circumscribing a portion of said shaft (3) and having an outer diameter sized to be received by said steering shaft bushing (2).

15. The cylinder lock of claim 8, wherein an adapter bushing (29) includes an orifice aligned with the opening (28) formed in the shaft bushing (2) and sized to receive the top portion of the second piston (26).

16. The cylinder lock of claim 8, further comprising a covering (30) circumscribing the shaft (3), wherein said shaft bushing (2) is attached over said covering (30).

17. The cylinder lock of claim 8, further comprising a plate (31) extending from an end of said shaft bushing (2) for fastening the cylinder lock onto a chassis portion of the motor vehicle.

* * * * *